W. MUTH.
PIANO-FORTE ACTION.

No. 191,810. Patented June 12, 1877.

Witnesses;
Franklin Barritt
Edwin B. Jennings

Inventor;
William Muth,
Per Henry Gerner,
Atty.

UNITED STATES PATENT OFFICE.

WILLIAM MUTH, OF MONTREAL, QUEBEC, CANADA.

IMPROVEMENT IN PIANO-FORTE ACTIONS.

Specification forming part of Letters Patent No. 191,810, dated June 12, 1877; application filed May 7, 1877.

*To all whom it may concern:*

Be it known that I, WILLIAM MUTH, of Montreal, in the Dominion of Canada, have invented a new and useful Improvement in Repetition-Action for Square and Grand Pianos; and I hereby declare the following to be a full and clear description of the same.

This invention relates to an improvement in the form of the knuckle-piece; and consists in constructing the said knuckle-piece with such a conformation of the side of it which bears against the fly as to permit the fly and the knuckle to remain constantly in contact, and therefore ready, at the slightest touch, to repeat the blow of the hammer upon the strings, so as to introduce what is termed a "repetition-movement," and rendering the instrument capable of producing a variety of pleasing sounds, resembling, in some instances, the beating of a drum.

By the use of this improvement the check-piece will be dispensed with; therefore the hammer-heel need not be rounded to fit the check-piece. Dampness will not prevent the fly from working, because the the weight of the hammer will always be pressing against the fly, and in consequence a lighter spring can be used on fly, whereby the action will be rendered easier and less noisy, and the movement of the regulating-screw will produce no unpleasant feeling on the fingers of the operator, as by the improvement the action of the regulating-screw simply causes the fly to slide on the knuckle. Therefore the use of these improvements will materially simplify and cheapen the cost of a piano, as well as improve its quality.

The invention will be readily understood by reference to the accompanying drawings, of which—

Figure 1:
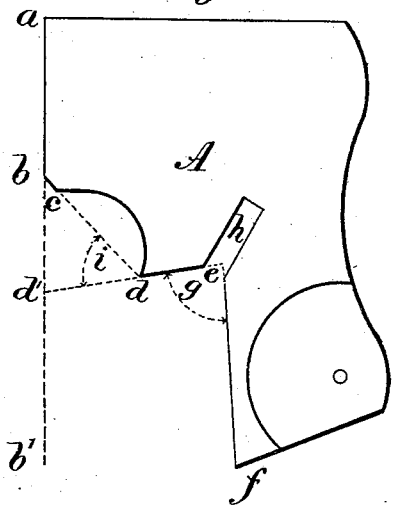
Figure 2:
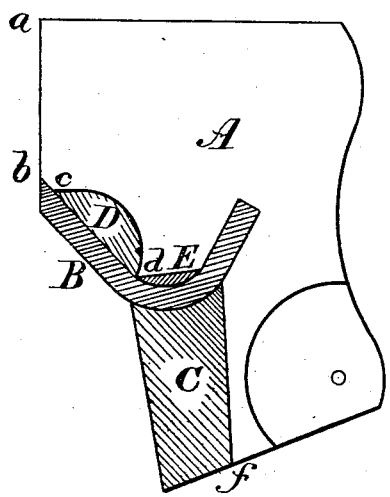

Figure 1 is an enlarged side elevation of the improved knuckle-piece without the cushions applied. Fig. 2 is a similar side elevation, showing the knuckle with the cushion applied.

The knuckle-piece A has its front face *a b c d e f* formed as shown in Fig. 1. The top part of this face is represented by the straight line *a b*, which occupies about one-third or one-fourth of the entire length of the knuckle-piece, (more or less,) and from the center of this face the hammer-arm projects.

The lower part of this face is also represented by a straight line, *e f*, the length of which constitutes about one-fourth the entire length of the knuckle, more or less.

The lines *a b* and *e f* should be in nearly or quite parallel planes; and if the line *a b* were prolonged to *b′* the perpendicular distance between the said lines *a b′* and *e f* would be about equal to one-half the entire width of the knuckle-piece.

From the top end of the line *e f* projects toward the line *a b′* a short straight line, *d e*, equal in length to about one-third (more or less) of the length of the line *e f*.

The angle *g* formed between the lines *d e* and *e f* should be a trifle less than ninety degrees.

A straight line drawn from *b* to *d* would inclose between it and a line, *d d′*, prolonged from *d e*, an angle, *i*, equal to about forty-five degrees, more or less.

A curved line, *c d*, forms a re-entering curve in the face of the knuckle-piece, and this curved line occupies about three-quarters (more or less) of the entire length of the line *b d*. From the angle *e* a re-entering notch, *h*, passes slopingly up into the knuckle-piece, as shown in the drawings.

The wooden block, formed as above described, is placed with the cushions B C, as shown in Fig. 2.

The backings D E are interposed between the cushion B and the knuckle-block, respectively in the cavity *c d* and on the face *d e*, as is also shown in Fig. 2. These backings are put in for the purpose of giving to the cushion B the proper elasticity of movement.

One end of the cushion-piece B is glued to the face *b c*, and the other end of it is put into the notch *h*, where it is glued fast. The other pieces, C D, should be properly glued in place.

When in position in the instrument the exterior faces of the cushions B C will press against the fly, and the conformation of these faces, as above described, will produce the desired improvement in the instrument.

Having described my invention, I claim—

1. The knuckle-block A, having its front face constructed in the form of the line $a\ b\ c\ d\ e\ h\ f$, substantially as and for the purpose set forth.

2. The cushions B and C and the backings D E, combined with and attached to the knuckle-block A, substantially as and for the purpose set forth.

WILLIAM MUTH.

Witnesses:
 EDMAN BROWN, P. M.,
 T. J. DE LANDRECIES.